United States Patent
Okuno et al.

(10) Patent No.: US 10,883,553 B2
(45) Date of Patent: Jan. 5, 2021

(54) ONE-WAY CLUTCH

(71) Applicant: CANON KABUSHIKI KAISHA, Tokyo (JP)

(72) Inventors: Kazuhide Okuno, Mishima (JP); Koji Kawamura, Yokohama (JP); Takashi Kuwata, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 16/227,413

(22) Filed: Dec. 20, 2018

(65) Prior Publication Data

US 2019/0195295 A1    Jun. 27, 2019

(30) Foreign Application Priority Data

Dec. 21, 2017    (JP) ................................ 2017-245508

(51) Int. Cl.
    *F16D 41/06*    (2006.01)

(52) U.S. Cl.
    CPC ...... *F16D 41/06* (2013.01); *F16D 2041/0608* (2013.01)

(58) Field of Classification Search
    CPC .............................................. F16D 2041/0608
    See application file for complete search history.

(56) References Cited

U.S. PATENT DOCUMENTS

| | | | |
|---|---|---|---|
| 6,931,954 B2 * | 8/2005 | Jinbo | F16H 3/005 74/322 |
| 2005/0130794 A1 | 6/2005 | Jinbo | |
| 2013/0068581 A1 | 3/2013 | Araki et al. | |
| 2014/0083809 A1 * | 3/2014 | Shimozaki | F16D 41/00 192/46 |
| 2015/0003871 A1 * | 1/2015 | Takahashi | G03G 21/1647 399/122 |
| 2017/0248171 A1 | 8/2017 | Kawamura et al. | |
| 2018/0210390 A1 | 7/2018 | Okuno et al. | |

FOREIGN PATENT DOCUMENTS

| | | |
|---|---|---|
| CN | 101608677 A | 12/2009 |
| CN | 102884335 A | 1/2013 |
| JP | H05-22867 A | 1/1993 |

(Continued)

OTHER PUBLICATIONS

Unpublished, copending U.S. Appl. No. 16/163,724, to Koji Kawamura, filed Oct. 18, 2018.

(Continued)

*Primary Examiner* — Timothy Hannon
(74) *Attorney, Agent, or Firm* — Venable LLP

(57) ABSTRACT

Provided is a one-way clutch in which a rotating direction of a first rotating member with respect to a second rotating member is switched. The first rotating member includes a recessed portion that receives a planetary gear and, in an outer circumferential portion thereof, an engaging portion that engages with the planetary gear, whereby relative rotation of the planetary gear and the first and second rotating members is switched to rotatable and unrotatable. When the first rotating member is relatively rotating with respect to the second rotating member, the planetary gear meshes with an internal gear of the second rotating member, and the position of the planetary gear is thereby restricted.

4 Claims, 7 Drawing Sheets

(56) References Cited

FOREIGN PATENT DOCUMENTS

| | | | |
|---|---|---|---|
| JP | 2002-340048 | A | 11/2002 |
| JP | 2005172199 | A | 6/2005 |
| JP | 2010-106985 | A | 5/2010 |
| JP | 5336418 | B2 | 11/2013 |
| JP | 2017198295 | A | 11/2017 |

OTHER PUBLICATIONS

Chinese Office Action, dated May 8, 2020, in corresponding Chinese Application No. 201811561860.7.

\* cited by examiner

ONE-WAY CLUTCH

BACKGROUND OF THE INVENTION

Field of the Invention

The present invention relates to a one-way clutch and, more particularly, to a one-way clutch of an internal gear type.

Description of the Related Art

As a one-way clutch used in a paper feeding mechanism and the like such as an image forming apparatus and an image reading apparatus, a one-way clutch of an internal gear type explained below is known. The one-way clutch includes a tubular outer member including an internal gear in an inner circumferential portion thereof, and an inner member rotatably provided in an inner space of the internal gear and including, in an outer circumferential portion thereof, a plurality of recessed portions in which locking edge portions are formed. The one-way clutch further includes a planetary gear that is rollably received in each of the plurality of recessed portions and meshes with the internal gear. When the inner member rotates to one side with respect to the outer member, the locking edge portions engage with tooth trough portions of the planetary gear according to the rotation, whereby the planetary gear becomes incapable of rolling, and the outer member and the inner member are driven to be coupled. When the inner member rotates to the other side with respect to the outer member, the tooth trough portions of the planetary gear and the locking edge portions are disengaged according to the rotation, whereby the planetary gear becomes capable of rolling. As a result, relative rotation of the outer member and the inner member is allowed, whereby the driving coupling of the outer member and the inner member is disconnected. (Japanese Patent No. 5336418)

SUMMARY OF THE INVENTION

A problem to be solved by the invention is explained with reference to FIG. 5A using a case of a one-way clutch of an internal gear type that has been used in the past. In FIG. 5A, reference numeral 81 denotes an inner member and reference numeral 85 denotes an outer member. An internal gear 86 is formed on an inner side of the outer member 85. Reference numeral 87 denotes a planetary gear fit in a recessed portion of the inner member 81.

In the one-way clutch of the internal gear type used in the past, when the inner member 81 is relatively rotating with respect to the outer member 85, a force applied from the inner member 81 or the outer member 85 sometimes deviates from the center of gravity of the planetary gear 87. Then, a tilt of the planetary gear 87 in a direction orthogonal to an axial direction is caused by the deviation of the center of gravity. Shaft end faces 89 and 90 of the planetary gear 87 simultaneously come into contact with recessed portion end faces 83 and 84 of the inner member 81 in order to restrict the tilt. Consequently, a high pressure is generated between the shaft end faces 89 and 90 and the recessed portion end faces 83 and 84 and causes sliding resistance when the planetary gear 87 rotates. Consequently, idling torque, which is torque at the time when the inner member 81 and the outer member 85 relatively rotate, is generated.

An object of the present invention is to provide a one-way clutch having small idling torque.

In order to achieve the object, a one-way clutch of the present invention includes a planetary gear, a first rotating member, and a second rotating member. The first rotating member includes a recessed portion that rotatably receives the planetary gear. The first rotating member also includes, in an outer circumferential region thereof, an engaging portion that engages with the planetary gear. The first rotating member rotates relatively to the planetary gear according to rotation of the planetary gear. The second rotating member includes, on an inner circumferential surface thereof, an internal gear that meshes with the planetary gear. The second rotating member is capable of rotatably housing the first rotating member in an inner space of the internal gear. The second rotating member rotates in a same direction as the planetary gear and rotates relatively to the first rotating member. When the first rotating member rotates to one side with respect to the second rotating member, the engaging portion engages with the planetary gear according to the rotation such that the planetary gear becomes incapable of rotating, and the second rotating member and the first rotating member are driven to be coupled. When the first rotating member rotates to the other side with respect to the second rotating member, the planetary gear and the engaging portion are disengaged according to the rotation such that the planetary gear becomes capable of rotating, relative rotation of the second rotating member and the first rotating member is allowed, and the driving coupling of the second rotating member and the first rotating member is disconnected. When one of the first rotating member and the second rotating member is rotating relatively to the other, the planetary gear meshes with the internal gear, and a position of the planetary gear is thereby restricted.

As explained above, according to the present invention, it is possible to provide a one-way clutch having small idling torque.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Figure 1:
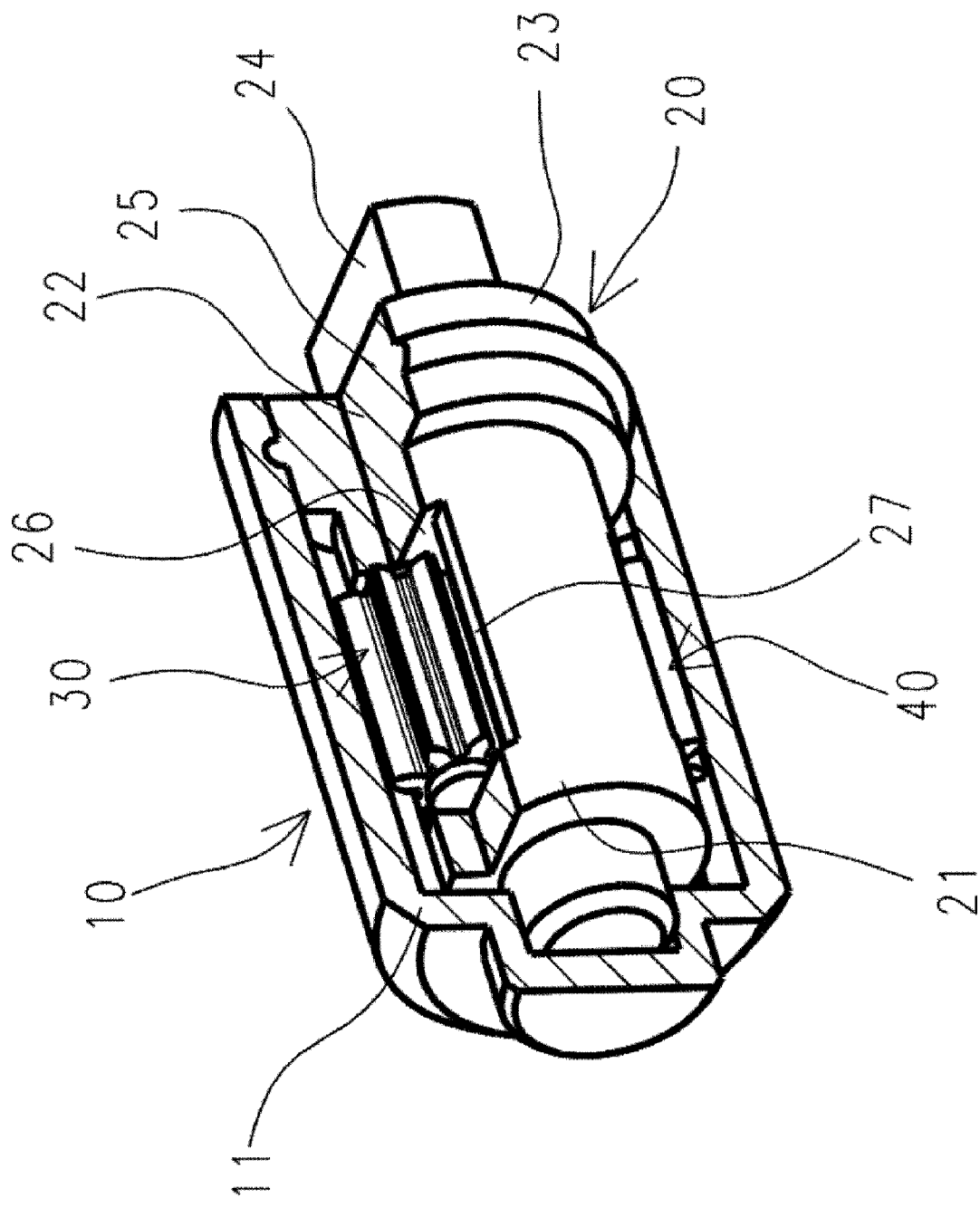
FIG. 1 is a perspective view of a one-way clutch according to a first embodiment.
Figure 2:
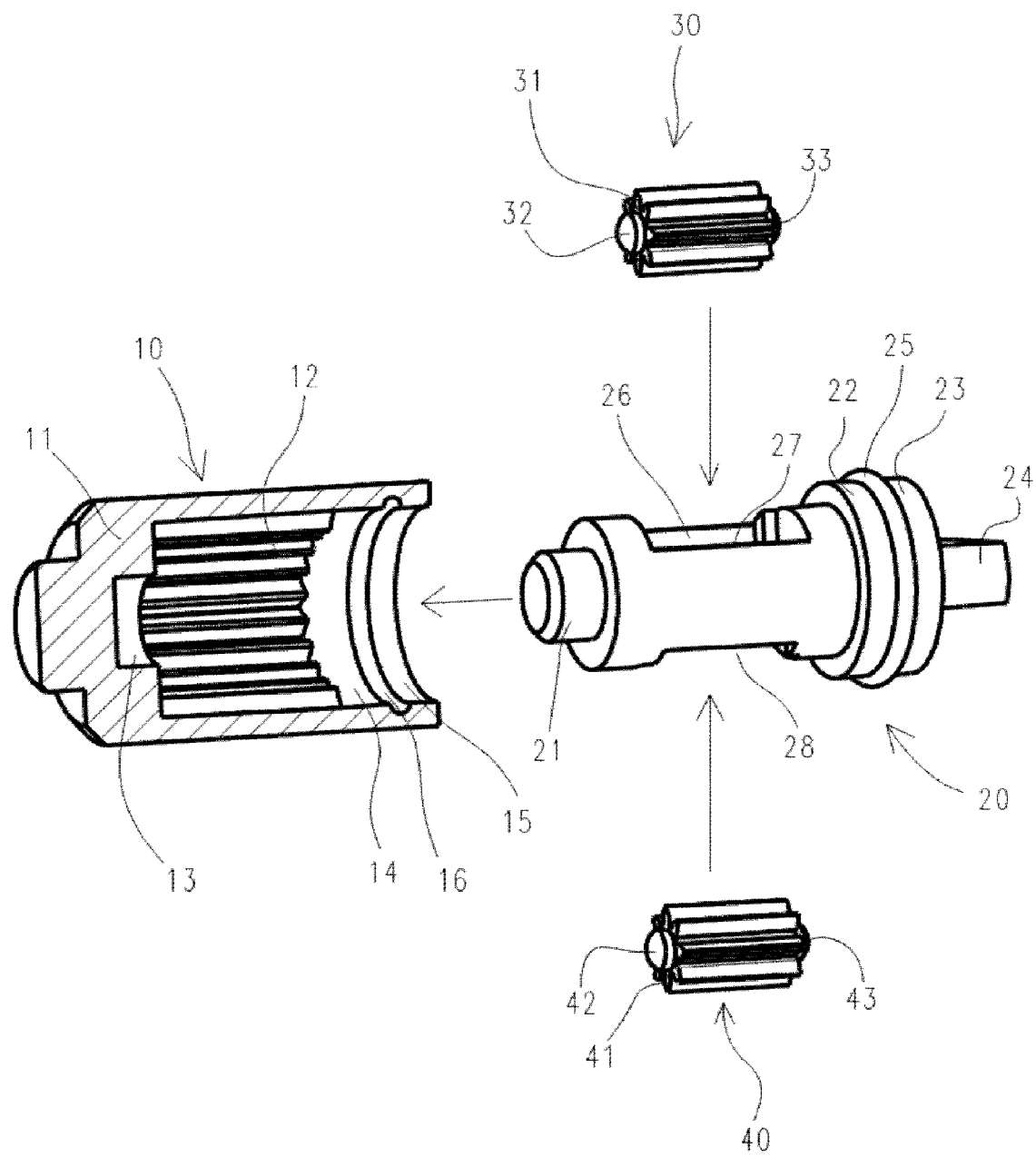
FIG. 2 is an exploded perspective view of the one-way clutch according to the first embodiment.

The configuration of a one-way clutch is explained with reference to FIGS. 1 and 2. The one-way clutch includes an outer member 10 (a second rotating member) forming a clutch case. The outer member 10 is configured by a bottomed cylinder body, one end portion in the axial direction of which is closed by an end wall 11. A series of teeth of an internal gear 12 are formed on the inner circumferential surface of the outer member 10.

A substantially columnar inner member 20 (a first rotating member) is rotatably provided in a cylindrical internal space of the outer member 10 equivalent to an inner space of the internal gear 12. The inner member 20 can be housed in the internal space. A boss (a second engaging portion) 21 around the center axis of the inner member 20 is formed at one end portion in the axial direction of the inner member 20. The boss 21 is rotatably engaged in a groove 13 formed on the end wall 11 of the outer member 10.

Circular flange portions (a third engaging portion) 22 and 23 are formed at the other end portion in the axial direction of the inner member 20. The circular flange portions 22 and 23 are rotatably engaged with inner circumferential surfaces 14 and 15 in an opening end portion of the outer member 10. An external connecting portion 24 formed to project is provided on the other side of the circular flange portions 22 and 23 of the inner member 20. A ring-shaped guide ridge (a projecting portion) 25 is formed on the outer circumferential surfaces of the circular flange portions 22 and 23. The ring-shaped guide ridge 25 is slidably fit in a ring-shaped recessed groove 16 formed on inner circumferential surfaces 14 and 15 in the opening end portion of the outer member 10. Consequently, the inner member 20 assembled with the outer member 10 does not easily come off the outer member 10.

With this configuration, the inner member 20 is supported by the outer member 10 at both the end portions in the axial direction and is capable of rotating concentrically with the center of the cylindrical internal space of the outer member 10 in the cylindrical internal space. The inner member 20 being concentric with the center of the cylindrical internal space of the outer member 10 means that the center of the internal gear 12 formed on the inner circumferential surface of the cylindrical internal space and the rotation center of the inner member 20 are concentric.

Two recessed portions 26 and 28 are formed in the inner member 20. The recessed portions 26 and 28 are formed by cutting out, in a pocket shape, parts of the outer circumferential portion of the inner member 20. Planetary gears 30 and 40, on the outer circumferential surface of which a series of teeth (external gear 31 and 41) are formed, are disposed in the recessed portions 26 and 28 to be capable of rotating around the center axes of the planetary gears 30 and 40, that is, capable of rolling and capable of being displaced in the circumferential direction of the inner member 20 by only a predetermined amount. The planetary gears 30 and 40 are received in the recessed portions 26 and 28 in this way. The external gears 31 and 41 of the planetary gears 30 and 40 are meshed with the internal gear 12.

The operation of the one-way clutch is explained with reference to FIGS. 3A to 3C.

Figure 3A:
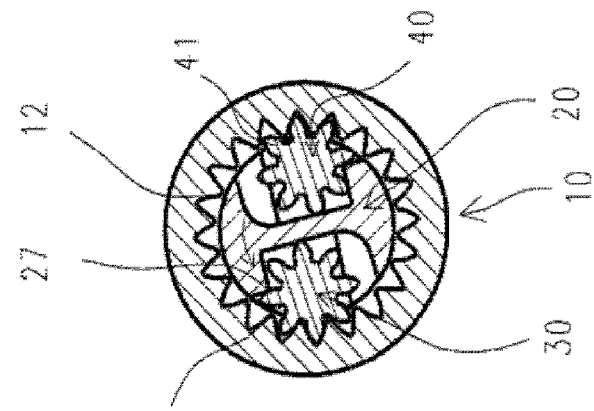
FIGS. 3A to 3C are sectional views of the one-way clutch according to the first embodiment.
Figure 3B:
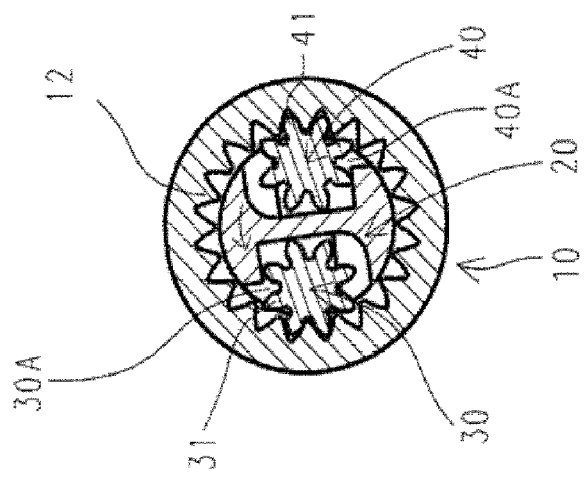
Figure 3C:
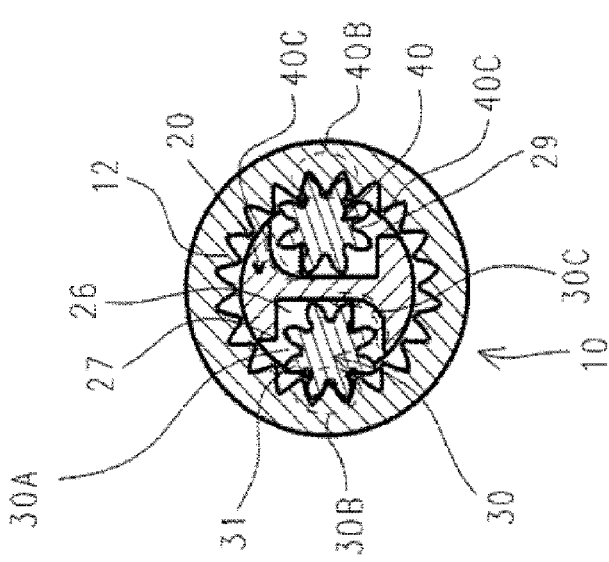

A rotating direction of the inner member 20 at clutch engagement time when the inner member 20 rotates to one side with respect to the outer member 10 is set as a counterclockwise direction in FIGS. 3A to 3C. A rotating direction of the inner member 20 at clutch non-engagement (release) time when the inner member 20 rotates to the other side with respect to the outer member 10 is set as a clockwise direction in FIGS. 3A to 3C.

In the counterclockwise direction of the inner member 20, locking edge portions 27 and 29, which selectively engage with tooth trough portions 30A and 40A by external gears 31 and 41 of the planetary gears 30 and 40 are formed at edge portions on a rotating direction delay side of the recessed portions 26 and 28.

When the inner member 20 rotates to one side with respect to the outer member 10, that is, in the counter clockwise direction in FIGS. 3A to 3C, the inner member 20 is displaced to the counterclockwise direction side with respect to the planetary gears 30 and 40 according to the rotation. As a result, the locking edge portion (engaging portion) 27 or 29 engages with the tooth trough portion 30A of the planetary gear 30 or the tooth trough portion 40A of the planetary gear 40 as shown in FIG. 3C from a state shown in FIG. 3A through FIG. 3B. Consequently, the planetary gear 30 or 40 becomes incapable of rolling (a state in which the planetary gear 30 or 40 cannot rotate). The external gear 31 or the external gear 41 of the planetary gear 30 or 40 and the internal gear 12 of the outer member 10 mesh with each other. The outer member 10 and the inner member 20 are driven to be coupled. That is, the rotation of the inner member 20 is transmitted to the outer member 10. The outer member 10 and the inner member 20 are integrated with the planetary gear 30 or 40 and rotate in the counterclockwise direction.

On the other hand, when the inner member 20 rotates to the other side with respect to the outer member 10, that is, the clockwise direction in FIGS. 3A to 3C, the inner member 20 is displaced to the clockwise direction side with respect to the planetary gears 30 and 40. As a result, the locking edge portion 27 or 29 is disengaged from the tooth trough portion 30A or 40A of the planetary gear 30 or 40. Consequently, both the planetary gears 30 and 40 become capable of rolling. The outer member 10 and the inner member 20 become capable of relatively rotating. The driving coupling of the outer member 10 and the inner member 20 is disconnected. That is, the rotation of the inner member 20 is not transmitted to the outer member 10. When the inner member 20 rotates in the clockwise direction, the outer member 10 rotates in the counterclockwise direction. Note that, at this time, the outer member 10 rotates in the same direction as the planetary gears 30 and 40.

Figure 4A:
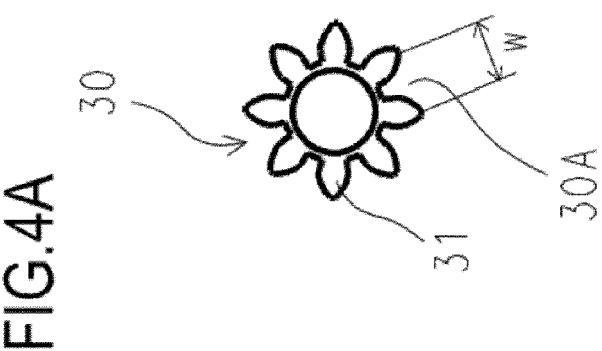
FIGS. 4A to 4C are diagrams of a planetary gear according to the first embodiment.
Figure 4B:
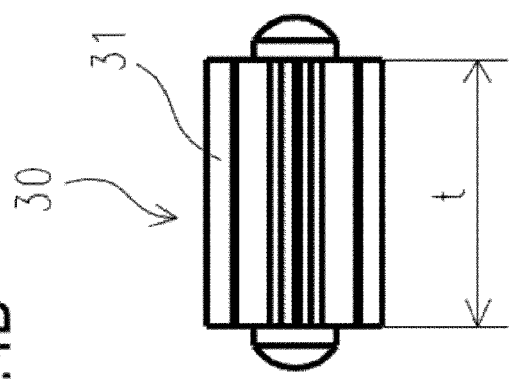

A condition under which the planetary gear 30 engages with the locking edge portion 27 of the inner member 20 is explained with reference to FIGS. 4A to 4C. A force applied from the inner member 20 or the outer member 10 deviates from the center of gravity of the planetary gear 30, whereby a tilt in a direction orthogonal to the axial direction occurs in the planetary gear 30. At this time, when a tile angle θ is large, the locking edge portion 27 does not enter the tooth trough portion 30A of the planetary gear 30 and does not engage with the tooth trough portion 30A. A condition under which the locking edge portion 27 engages with the tooth trough portion 30A is represented as follows using a width w to the tooth trough portion 30A and a tooth width t of the external gear 31.

[Expression 1]

$$\theta \leqq \arctan\frac{w}{t} \quad (1)$$

Figure 4C:
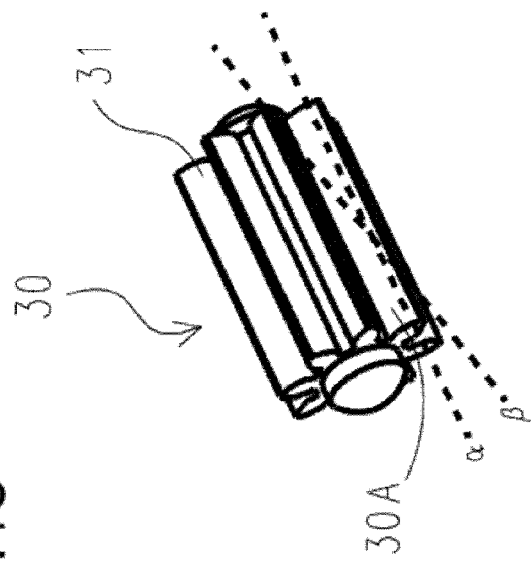

When Expression (1) is satisfied, the locking edge portion 27 receives the tooth trough portion 30A in a positional relation indicated by a straight line α in FIG. 4C. Therefore, the locking edge portion 27 can engage with the tooth trough portion 30A. On the other hand, when Expression (1) is not satisfied, the locking edge portion 27 receives the tooth trough portion 30A in a positional relation indicated by a straight line β in FIG. 4C. Therefore, the locking edge portion 27 comes into contact with both of two external teeth forming the tooth trough portion 30A. The locking edge portion 27 cannot engage with the tooth trough portion 30A. Therefore, the planetary gear 30 needs to be restricted to satisfy Expression (1).

Methods of restricting tilts of the planetary gears in the one-way clutches in the related art and this embodiment and magnitudes of idling torque are explained with reference to FIGS. 5A to 5C and FIGS. 6A and 6B.

Figure 5B:
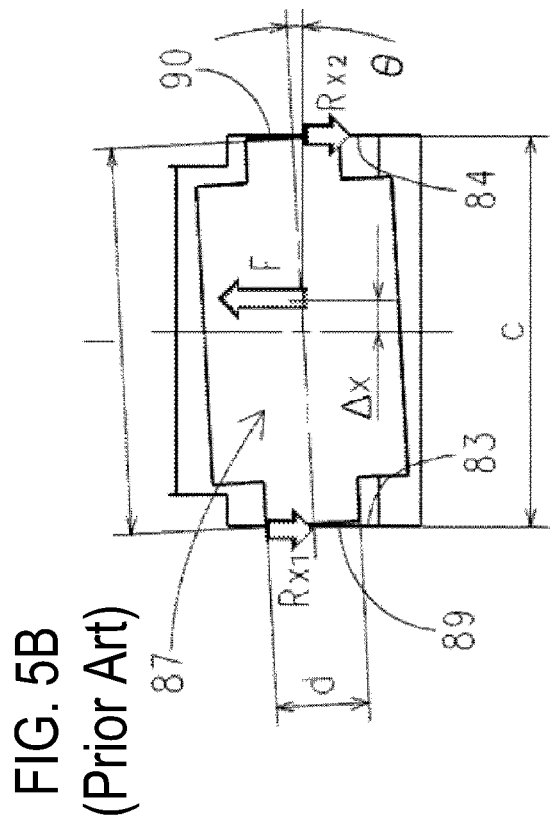
FIGS. 5A to 5C are sectional views for explaining restriction of a tilt of the planetary gear of the one-way clutch.
Figure 5A:
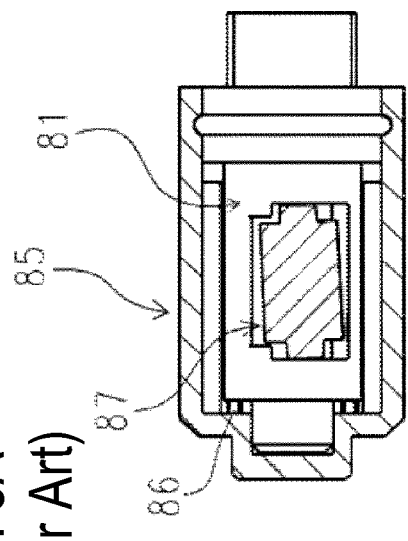

In the related art, as shown in FIG. 5A, to satisfy Expression (1), a tilt of the planetary gear 87 in the direction orthogonal to the axial direction is restricted by the recessed portion end faces 89 and 90 of the inner member 81. As shown in FIG. 5B, when the axial direction length of the planetary gear 87 is represented as l, the diameter of the shaft is represented as d, and the axial direction length of the recessed portion is represented as c, a maximum value $\theta_{max}$ that the tilt angle θ can take is as follows.

[Expression 2]

$$\theta_{max} = \arccos\frac{lc + d\sqrt{l^2 + d^2 - c^2}}{l^2 + d^2} \quad (2)$$

The tilt angle $\theta_{max}$ of Expression (2) is set to satisfy Expression (1), whereby the planetary gear 87 engages with the locking edge 93.

However, in the related art, to restrict the tilt of the planetary gear 87, the shaft end faces 89 and 90 of the planetary gear 87 simultaneously come into contact with the recessed portion end faces 83 and 84. Therefore, idling torque is generated. As shown in FIG. 5B, forces applied in the direction orthogonal to the axial direction from the recessed portion end faces 83 and 84 of the inner member 81 to the planetary gear 87 are represented as $R_{x1}$ and $R_{x2}$, a coefficient of friction between the inner member 81 and the planetary gear 87 is represented as μ, and a force applied in the direction orthogonal to the axial direction from the outer member 85 to the planetary gear 87 is represented as F. As explained above, t and c respectively indicate the tooth width of the external gear 31 and the axial direction length of the recessed portion. Therefore, when deviation of a force F applying place from the axial direction center of the recessed portion is represented as Δx, the forces $R_{x1}$ and $R_{x2}$ are calculated as follows.

[Expression 3]

$$R_{x1} = R_{x2} = \frac{\Delta x - c/2}{2t - c\mu}F \quad (3)$$

Therefore, a load is applied to the inner member 81 by a value indicated by Expression (3) when the planetary gear 87 tilts. Therefore, since sliding resistance is generated according to the rotation of the planetary gear 87, the idling torque increases.

Figure 5C:
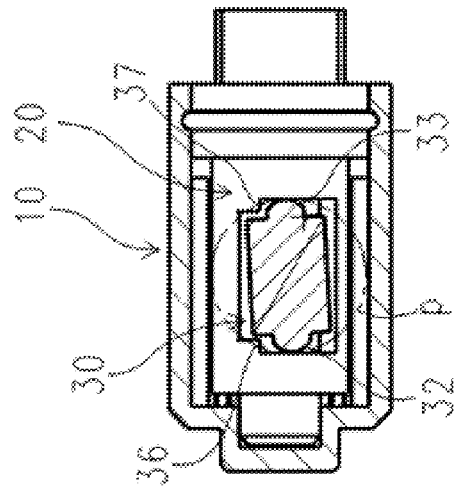
Figure 6A:
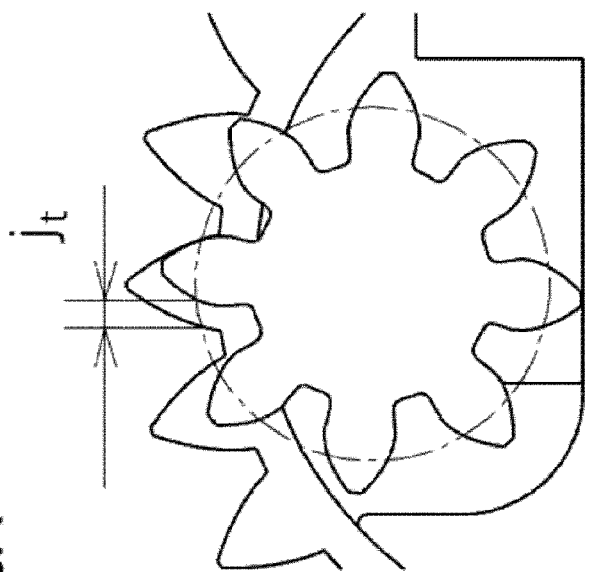
FIGS. 6A and 6B are sectional views of the one-way clutch according to the first embodiment.
Figure 6B:
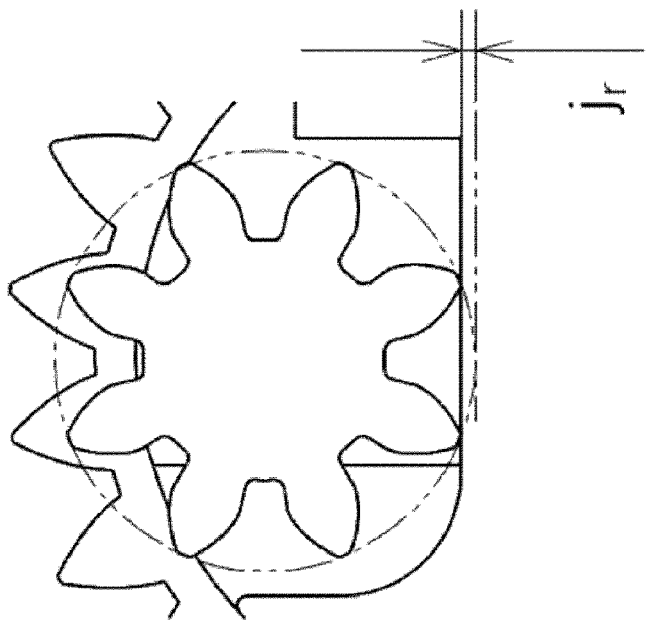

On the other hand, in this embodiment, as shown in FIG. 5C, end faces 32 and 33 of a shaft portion of the planetary gear 30 are spherical. Therefore, the planetary gear 30 is fit on the inner side of a column p having, as a diameter, an axial direction length c of the recessed portion. As a result, the end faces 32 and 33 of the shaft portion do not simultaneously come into contact with recessed portion end faces 36 and 37 of the inner member 20. On the other hand, an external gear of the planetary gear 30 is configured to mesh with an internal gear of the outer member 10. That is, the position of the planetary gear 30 is restricted by the outer member 10. As a result, a tilt of the planetary gear 30 in a direction orthogonal to the axial direction is restricted by the outer member 10. Therefore, a contact area of the planetary gear 30 and the inner member 20 decreases. The idling torque indicated by Expression (3) in the related art is not generated. As shown in FIG. 6A, a backlash amount in the direction orthogonal to the axial direction between the external gear 31 of the planetary gear 30 and the internal gear 12 of the outer member 10 is represented as jt. An angle that is formed, at one point on a tooth surface of the planetary gear 30, by a radial line of the planetary gear 30 and a tangential line of the tooth surface and a tooth shape of the internal gear of the outer member 10 is represented as a pressure angle α. As shown in FIG. 6B, a maximum falling amount from a regular position of the planetary gear 30 is represented as jr. This means a difference between a distance from the center to the tooth tip of the planetary gear 30 and a distance from the center of the planetary gear 30 to a position closest to a shaft of the inner member 20, with which the tooth tip of the planetary gear 30 is in contact in the recessed portion of the inner member 20. Then, the maximum value $\theta_{max}$ that the tilt angle θ can take in the restriction by the outer member 10 is calculated as follows.

[Expression 4]

$$\theta_{max} = \arctan\frac{j_t + 2j_r\tan\alpha}{l} \quad (4)$$

The following expression only has to be satisfied from Expression (2) and Expression (4) to restrict the tile of the planetary gear 30 with the outer member 10 rather than the inner member 20.

[Expression 5]

$$\arccos\frac{lc + d\sqrt{l^2 + d^2 - c^2}}{l^2 + d^2} < \arctan\frac{j_t + 2j_r\tan\alpha}{l} \quad (5)$$

The tilt angle $\theta_{max}$ of Expression (4) is set to satisfy Expression (1), whereby the planetary gear 30 engages with the locking edge portion 27. Only the restriction of the planetary gear 30 is explained above. However, restriction of the planetary gear 40 is the same. In this embodiment, the configuration including the plurality of planetary gears is explained. However, one planetary gear can be restricted in the same manner.

Calculation of idling torques in the related art and this embodiment is explained. CAD models of the related art and this embodiment were created. A state in which the planetary gear tilted was created by idly rotating the outer members in a state in which the outer member was tilted from a predetermined position. Idling torque was calculated using NX mosion, which is simulation software. A result of the idling torque calculation is shown in Table 1. Whereas the idling torque in the related art is 286 mN·mm, the idling torque in this embodiment is 77 mN·mm Therefore, the idling torque can be reduced in the configuration of this embodiment.

TABLE 1

| Examination model | Idling torque simulation result |
|---|---|
| Related art | 286 mN · mm |
| This embodiment | 77 mN · mm |

Second Embodiment

Figure 7:
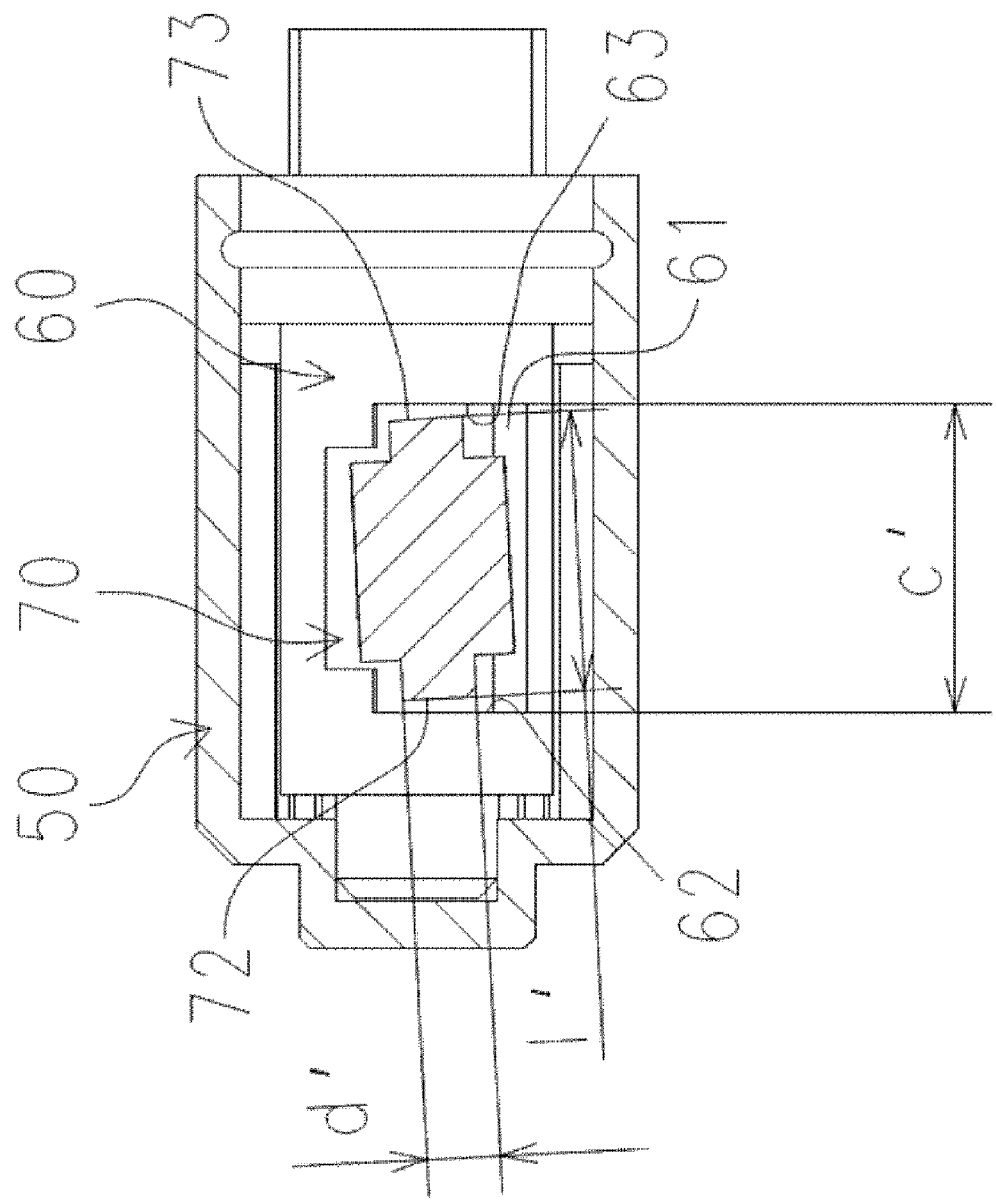
FIG. 7 is a sectional view of a one-way clutch according to a second embodiment.

A second embodiment is explained with reference to FIG. 7. In this embodiment, the shape of the planetary gear in the one-way clutch in the first embodiment is changed. In a planetary gear 70, shaft end faces 72 and 73 are planes. When the axial direction length of the planetary gear 70 is represented as 1', the diameter of a shaft of the planetary gear 70 is represented as d', and an axial direction length of a recessed portion 61 of an inner member 60 is represented as c', the planetary gear 70 is designed to satisfy the following expression. [Expression 6]

$$l'^2 + d'^2 \leq c'^2 \quad (6)$$

Expression (6) means that the planetary gear 70 is fit in a columnar space formed in the recessed portion 61 of the inner member 60 and having, as a diameter, the axial direction length c' of the recessed portion 61.

Consequently, the shaft end faces 72 and 73 of the planetary gear 70 do not simultaneously come into contact with recessed portion end faces 62 and 63 of the inner member 60. As in the first embodiment, an external gear of the planetary gear 70 meshes with an internal gear of an outer member 50, whereby the position of the planetary gear 70 is restricted by the outer member 50. As a result, a tilt of the planetary gear 70 in a direction orthogonal to the axial direction is restricted by the outer member 50 rather than the inner member 60. Therefore, it is possible to reduce idling torque in this embodiment as well.

In this embodiment, the shaft end faces 72 and 73 are planes. However, the shaft end faces 72 and 73 may be spherical.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-245508, filed on Dec. 21, 2017, which is hereby incorporated by reference herein in its entirety.

What is claimed is:

1. A one-way clutch comprising:
at least one planetary gear;
a first rotating member including a recessed portion that rotatably receives the planetary gear and, in an outer circumferential region thereof, an engaging portion that engages with the planetary gear, the first rotating member rotating relatively to the planetary gear according to rotation of the planetary gear; and
a second rotating member including, on an inner circumferential surface thereof, an internal gear that meshes with the planetary gear, the second rotating member being capable of rotatably housing the first rotating member in an inner space of the internal gear, the second rotating member rotating in a same direction as the planetary gear and rotating relatively to the first rotating member,
wherein, when the first rotating member rotates to one side with respect to the second rotating member, the engaging portion engages with the planetary gear according to the rotation such that the planetary gear becomes incapable of rotating and the second rotating member and the first rotating member are driven to be coupled,
wherein, when the first rotating member rotates to the other side with respect to the second rotating member, the planetary gear and the engaging portion are disengaged according to the rotation such that the planetary gear becomes capable of rotating, relative rotation of the second rotating member and the first rotating member is allowed, and the driving coupling of the second rotating member and the first rotating member is disconnected, and
wherein, when one of the first rotating member and the second rotating member is rotating relatively to the other, the planetary gear meshes with the internal gear, and a position of the planetary gear is thereby restricted,
wherein, when one of the first rotating member and the second rotating member is rotating relatively to the other, the planetary gear meshes with the internal gear, and a tilt of the planetary gear in a direction orthogonal to an axial direction is thereby restricted,
wherein the planetary gear includes shaft portions respectively at both end portions in the axial direction and an end face of each of the shaft portions is spherical.

2. The one-way clutch according to claim 1, further comprising a plurality of planetary gears, each of the plurality of planetary gears being received in of a corresponding one of a plurality of recessed portions of the first rotating member.

3. The one-way clutch according to claim 1, wherein the first rotating member further includes, at one end portion in an axial direction, a second engaging portion that engages with the second rotating member and, at the other end portion in the axial direction, a third engaging portion that engages with the second rotating member.

4. The one-way clutch according to claim 1, wherein the first rotating member further includes a ring-shaped projecting portion at one end portion in an axial direction, the ring-shaped projecting portion fitting in a groove formed in the second rotating member.

* * * * *